(12) United States Patent
Kobayashi (10) Patent No.: US 8,712,936 B2
(45) Date of Patent: *Apr. 29, 2014

(54) INFORMATION PROCESSING APPARATUS, INFORMATION PROCESSING METHOD, AND PROGRAM

(71) Applicant: Sony Corporation, Tokyo (JP)

(72) Inventor: Yoshiyuki Kobayashi, Tokyo (JP)

(73) Assignee: Sony Corporation, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 13/923,999

(22) Filed: Jun. 21, 2013

(65) Prior Publication Data

US 2013/0311410 A1 Nov. 21, 2013

Related U.S. Application Data

(63) Continuation of application No. 12/241,957, filed on Sep. 30, 2008, now Pat. No. 8,494,986.

(30) Foreign Application Priority Data

Oct. 18, 2007 (JP) .................................. 2007-270931

(51) Int. Cl.
*G06F 15/18* (2006.01)
(52) U.S. Cl.
USPC .......................................................... 706/13
(58) Field of Classification Search
None
See application file for complete search history.

(56) References Cited

FOREIGN PATENT DOCUMENTS

| JP | 2005-77865 | 3/2005 |
|----|-----------|--------|
| JP | 2006-28561 | 2/2006 |
| JP | 2007-122186 | 5/2007 |

OTHER PUBLICATIONS

Manaris et al ("A corpus-Based Hybrid Approach to Music Analysis and Composition" Jul. 2007).
Shao et al ("Automatic Feature Weight Assignment Based on Genetic Algorithm for Image Retrieval" IEEE 2003).
Itoyama et al ("Automatic Feature Weighing in Automatic Transcription of Specified Part in Polyphonic Music" 2006).
Muni et al ("Genetic Programming for Simultaneous Feature Selection and Classifier Design" Feb. 2006).
Koganezawa et al., "Learning Optimal Parameter of Retrieval in Similarity-Based Image Retrieval Using Genetic Algorithm," Proceedings of the 1996 IEICE General Conference, p. 272, (1998).
Office Action dated Jul. 24, 2009, issued by the Japanese Patent Office, in corresponding Japanese application No. JP 2007-270931.

*Primary Examiner* — Lut Wong
(74) *Attorney, Agent, or Firm* — Finnegan, Henderson, Farabow, Garrett & Dunner, L.L.P.

(57) ABSTRACT

An information processing apparatus for generating a similarity determination algorithm determining a similarity between a pair of data. The apparatus includes: a feature-quantity-extraction expression list generation mechanism generating a feature quantity-extraction expression list including a plurality of feature-quantity-extraction expressions including a plurality of operators by updating the feature-quantity extraction expression list of a preceding generation; a calculation mechanism inputting first and second data given as teacher data into each of the feature-quantity-extraction expressions in the feature-quantity-extraction expression list to calculate a feature quantity corresponding to each of the first and the second data; an evaluation-value calculation mechanism calculating the evaluation value of each of the feature-quantity-extraction expressions using the calculated feature quantities and a similarity between the first and the second data; and a similarity-calculation expression estimation mechanism estimating a similarity calculation expression for calculating a similarity between the first and the second data.

15 Claims, 10 Drawing Sheets

FEATURE-QUANTITY EXTRACTION EXPRESSION LIST

FEATURE-QUANTITY EXTRACTION EXPRESSION f1  WavM, 16#DownSampling_To:27.999268, 16#NormalizeEach, 16#Skewness
WavM, 16#DownSampling_To:62.265602, 16#DownSampling_To:57.964432, 16#StdDev
WavM, 16#IPF_1:0.215608, 16#LogAxisOctH:9.528571, 16#Order, 16#Entropy
WavM, 16#Histogram:33.312595, 16#StdDev
WavM, 16#Histogram:39.602398, 16#Skewness

· · ·

FEATURE-QUANTITY EXTRACTION EXPRESSION fm  WavM, Abs, 16#DownSampling_To:43.249527, 16#Extract1:0.254782
WavM, NormalizeAvg, 16#Max
WavM, Sign, 16#MaxIndex

| | DATA AT1 | DATA BT1 | SIMILARITY BETWEEN DATA AT1 AND DATA BT1 |
|---|---|---|---|
| TEACHER DATA T1 | | | |
| TEACHER DATA T2 | DATA AT2 | DATA BT2 | SIMILARITY BETWEEN DATA AT2 AND DATA BT2 |
| TEACHER DATA T3 | DATA AT3 | DATA BT3 | SIMILARITY BETWEEN DATA AT3 AND DATA BT3 |
| ⋮ | ⋮ | ⋮ | ⋮ |
| TEACHER DATA TL | DATA ATL | DATA BTL | SIMILARITY BETWEEN DATA ATL AND DATA BTL |

FIG. 8

| | FEATURE QUANTITY OF DATA ATi | | | | FEATURE QUANTITY OF DATA BTi | | | |
|---|---|---|---|---|---|---|---|---|
| | EXPRESSION f1 | EXPRESSION f2 | ... | EXPRESSION fm | EXPRESSION f1 | EXPRESSION f2 | ... | EXPRESSION fm |
| TEACHER DATA T1 | 0.563725 | 0.431047 | | 0.713684 | 0.42116 | 0.790596 | | 0.583943 |
| TEACHER DATA T2 | 0.324616 | 0.753864 | | 0.931711 | 0.428882 | 0.306535 | | 0.772183 |
| TEACHER DATA T3 | 0.085154 | 0.051845 | | 0.720371 | 0.953427 | 0.965238 | | 0.204537 |
| ⋮ | | | | | | | | |
| TEACHER DATA TL | 0.244369 | 0.172228 | | 0.90102 | 0.566631 | 0.079318 | | 0.054531 |

FIG. 9

| | DISTANCE OF FEATURE QUANTITIES BY EXPRESSION f1 | DISTANCE OF FEATURE QUANTITIES BY EXPRESSION f2 | ... | DISTANCE OF FEATURE QUANTITIES BY EXPRESSION fm | SIMILARITY |
|---|---|---|---|---|---|
| TEACHER DATA T1 | 0.142565 | 0.359549 | | 0.12974 | 0.170257 |
| TEACHER DATA T2 | 0.104266 | 0.447329 | | 0.159529 | 0.397595 |
| TEACHER DATA T3 | 0.868273 | 0.913393 | | 0.515834 | 0.632679 |
| TEACHER DATA T4 | 0.101298 | 0.70863 | | 0.188369 | 0.247853 |
| ... | | | | | |
| TEACHER DATA TL | 0.322262 | 0.09291 | | 0.846488 | 0.6628 |

FIG. 10

| | USE TABLE TB1 | USE TABLE TB2 | USE TABLE TB3 | ... | USE TABLE TBp |
|---|---|---|---|---|---|
| FEATURE-QUANTITY EXTRACTION EXPRESSION f1 | ○ | × | ○ | ... | ○ |
| FEATURE-QUANTITY EXTRACTION EXPRESSION f2 | ○ | ○ | × | ... | × |
| FEATURE-QUANTITY EXTRACTION EXPRESSION f3 | ○ | ○ | ○ | ... | ○ |
| FEATURE-QUANTITY EXTRACTION EXPRESSION f4 | ○ | ○ | ○ | ... | ○ |
| ... | ... | ... | ... | ... | ... |
| FEATURE-QUANTITY EXTRACTION EXPRESSION fm | ○ | ○ | ○ | ... | × |

INFORMATION PROCESSING APPARATUS, INFORMATION PROCESSING METHOD, AND PROGRAM

CROSS REFERENCES TO RELATED APPLICATIONS

This is a continuation of application Ser. No. 12/241,957, filed Sep. 30, 2008, based upon and claim the benefit of Japanese Patent Application No. P2007-270931 filed with the Japanese Patent Office on Oct. 18, 2007, the entire contents of both of which are incorporated herein by reference.

BACKGROUND OF THE INVENTION

1. Field of the Invention

The present invention relates to an information processing apparatus, an information processing method, and a program. More particularly, the present invention relates to an information processing apparatus, an information processing method, and a program which are capable of automatically developing an algorithm for determining a similarity between a pair of data.

2. Description of the Related Art

To date, a large number of methods for determining a similarity of image data, music data, etc., have been proposed (for example, Japanese Unexamined Patent Application Publication Nos. 2006-285615, 2005-77865).

For example, when a similarity between a plurality of music data is determined, a method, in which a rhythm, a tempo, etc., are extracted from each of the plurality of music data as feature quantities, and the extracted rhythms or tempos are compared with each other, or the like is used.

Also, for example, when a similarity between a plurality of image data is determined, a method, in which a histogram of pixels, etc., is extracted as a feature quantity, and the extracted histograms are compared with each other, or the like is used.

That is to say, in a related-art method of determining a similarity of a plurality of data, it is commonly carried out to extract individual feature quantities from a plurality of data of which a similarity is to be determined, and to compare the extracted feature quantities with each other.

SUMMARY OF THE INVENTION

However, for a feature quantity extracted from the data of which a similarity is to be determined, it is necessary for a person to design the feature quantity. Thus, it has been difficult to dynamically develop a similarity-determination algorithm at a user's site. Also, much time and work have been necessary for developing a similarity-determination algorithm.

Also, in many cases, the kind of data whose specific feature quantity functions effectively in order to determine a similarity is limited. Thus, when a feature quantity to be extracted is determined in advance, the kind of data whose similarity is to be determined is limited. For example, in the case where a feature quantity is of music data, the target data is limited to music data, and if it is of image data, the target data is limited to image data. Also, a similarity determination is limited to the range that can be expressed by a feature quantity determined by a person at design time. It might be difficult to support the emergence of a new data type in the future, and to support a similarity determination from a new point of view.

As described above, there have been methods of determining a similarity between a pair of data on the basis of a feature quantity designed by a person up to now. However, a proposal has not been made yet on a method of automatically developing a similarity-determination algorithm for determining a similarity between a pair of data by automatically determining what information is extracted as a feature quantity from any kinds of data, such as music data, image data, and the like.

The present invention has been made in view of such circumstances. It is desirable to make it possible to automatically develop an algorithm allowing determination of a similarity between a pair of any kinds of data on the basis of a feature quantity thereof including automatic determination on what kind of information is extracted as a feature quantity from the data whose similarity is to be determined.

According to an embodiment of the present invention, there is provided an information processing apparatus for generating a similarity determination algorithm determining a similarity between a pair of data, the information processing apparatus including: feature-quantity-extraction expression list generation means for generating a feature-quantity-extraction expression list including a plurality of feature-quantity-extraction expressions including a plurality of operators by updating the feature-quantity-extraction expression list of a preceding generation on the basis of an evaluation value of each of the feature-quantity-extraction expressions of the preceding generation; calculation means for inputting first data and second data given as teacher data into each feature-quantity-extraction expression included in the feature-quantity-extraction expression list to calculate a feature quantity corresponding to each of the first data and the second data; evaluation-value calculation means for calculating the evaluation value of each feature-quantity-extraction expression included in the feature-quantity-extraction expression list using the calculated feature quantities and a similarity between the first data and the second data given as the teacher data; and similarity-calculation-expression estimation means for estimating a similarity calculation expression for calculating a similarity between the first data and the second data given as the teacher data using the calculated quantities.

In the embodiment of the present invention, the feature-quantity-extraction expression list generation means may randomly generate a plurality of the feature-quantity-extraction expressions included in the feature-quantity-extraction expression list of a first generation, may regard the feature-quantity-extraction expression list of a second generation and after as a gene of the plurality of feature-quantity-extraction expressions included in the feature-quantity-extraction expression list of a preceding generation, and may generate the feature-quantity-extraction expression list by updating the feature-quantity-extraction expression list of the preceding generation using a genetic algorithm including at least one of selection processing, crossover processing, or mutation processing on the basis of the evaluation value of the feature-quantity-extraction expression.

In the embodiment of the present invention, the evaluation-value calculation means may calculate precision when estimating a similarity between the first data and the second data given as the teacher data using a distance between the calculated feature quantities corresponding to the first and the second data as the evaluation value of each of the feature-quantity-extraction expressions included in the feature-quantity-extraction expression list.

In the embodiment of the present invention, the similarity-calculation-expression estimation means may generate a usetable group including a plurality of use tables classifying a plurality of feature-quantity-extraction expressions included in the feature-quantity-extraction expression list of the last generation into use or non-use, may estimate by regression or by determination a similarity calculation expression for calculating a similarity between the first data and the second data given as teacher data from a distance between the feature quantities corresponding to the first and the second data, the distance obtained by inputting the first data and the second data given as the teacher data to the feature-quantity-extraction expression classified as use by each use table, may calculate reference amount of information of an estimation result as an evaluation value of the use table, and may update the use-table group using a genetic algorithm regarding the use table as a gene.

According to another embodiment of the present invention, there is provided a method of processing information in an information processing apparatus for generating a similarity determination algorithm determining a similarity between a pair of data, the method including the steps of: randomly generating a first-generation feature-quantity-extraction list including a plurality of feature-quantity-extraction expressions including a plurality of operators; inputting first data and second data given as teacher data into each of the feature-quantity-extraction expressions included in the feature-quantity-extraction expression list to calculate a feature quantity corresponding to each of the first data and the second data; estimating a similarity calculation expression for calculating a similarity between the first data and the second data given as the teacher data using the calculated feature quantity, calculating the evaluation value of each of the feature-quantity-extraction expression included in the feature-quantity-extraction expression list using the calculated feature quantity, and a similarity between the first data and the second data given as the teacher data; and generating the feature-quantity-extraction expression list of a second generation and after by updating the feature-quantity-extraction expression list of a preceding generation on the basis of the evaluation value of the feature-quantity-extraction expression of the preceding generation.

According to another embodiment of the present invention, there is provided a program for a computer of an information processing apparatus generating a similarity-determination algorithm determining a similarity of a pair of data, the program including the steps of: randomly generating a first-generation feature-quantity-extraction list including a plurality of feature-quantity-extraction expressions including a plurality of operators; inputting first data and second data given as teacher data into each of the feature-quantity-extraction expressions included in the feature-quantity-extraction expression list to calculate a feature quantity corresponding to each of the first data and the second data; estimating a similarity calculation example for calculating a similarity between the first data and the second data given as the teacher data using the calculated the feature quantity, calculating the evaluation value of each feature-quantity-extraction expression included in the feature-quantity-extraction expression list using the calculated feature quantity, and a similarity between the first data and the second data given as the teacher data; and generating the feature-quantity-extraction expression list of a second generation and after by updating the feature-quantity-extraction expression list of a preceding generation on the basis of the evaluation value of the feature-quantity-extraction expression of the preceding generation.

By an embodiment of the present invention, a first-generation feature-quantity-extraction list including a plurality of feature-quantity-extraction expressions including a plurality of operators is randomly generated; first data and second data given as teacher data are input into each feature-quantity-extraction expression included in the feature-quantity-extraction expression list to calculate a feature quantity corresponding to each of the first data and the second data. Also, a similarity calculation, expression for calculating a similarity between the first data and the second data given as the teacher data is estimated using the calculated feature quantity. Furthermore, the evaluation value of each feature-quantity-extraction expression included in the feature-quantity-extraction expression list is calculated using the calculated feature quantities and a similarity between the first data and the second data given as the teacher data. The feature-quantity-extraction expression list of the second generation and after is generated by updating the feature-quantity-extraction expression list of the preceding generation on the basis of the evaluation value of the feature-quantity-extraction expression of the preceding generation.

By an embodiment of the present invention, it is possible to automatically develop an algorithm for determining a similarity between a pair of data of any kind.

Also, by an embodiment of the present invention, it becomes possible to automatically determine what kind of information is extracted from data whose similarity is to be determined.

DESCRIPTION OF THE PREFERRED EMBODIMENTS

In the following, a detailed description will be given of a specific embodiment of the present invention with reference to the drawings.

Figure 1:
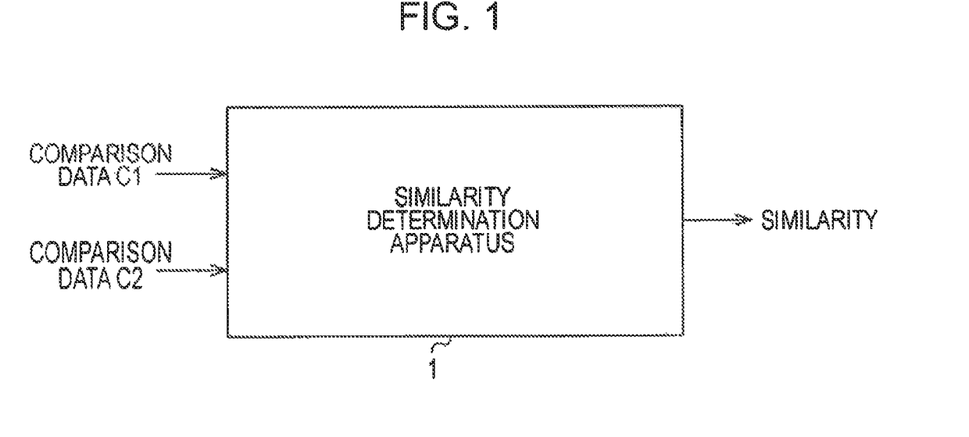
FIG. 1 is a block diagram illustrating an example of a similarity determination apparatus using a similarity calculation expression generated by a similarity-determination-machine development system to which the present invention is applied.

A similarity-determination-machine development system 10 (FIG. 2), to which the present invention is applied, generates a similarity determination machine on the basis of learning using a plurality of teacher data including two pieces of actual data of which a similarity is given in advance. The generated similarity determination machine is applied to a similarity determination apparatus 1, as shown in FIG. 1, which receives the input of a plurality of data (comparison data C1 and comparison data C2 in the case of FIG. 1) whose similarity is to be compared, and outputs a similarity between the plurality of data.

The comparison data C1 and C2 should be multidimensional data of any kind. However, it is necessary that the teacher data and the comparison data C1 and C2 are the same kind of data. For example, music data having a dimension of time and a dimension of channel, image data having an X dimension, a Y dimension, and a pixel dimension, moving-image data which has a time dimension added to image data, etc., can be the comparison data C1 and C2.

A similarity output from the similarity determination apparatus 1 has a value from 0.0 to 1.0 in accordance with a degree of the similarity. If there is no similarity between the two, the value is 0.0, and if the two are completely the same, the value is 1.0.

Figure 2:
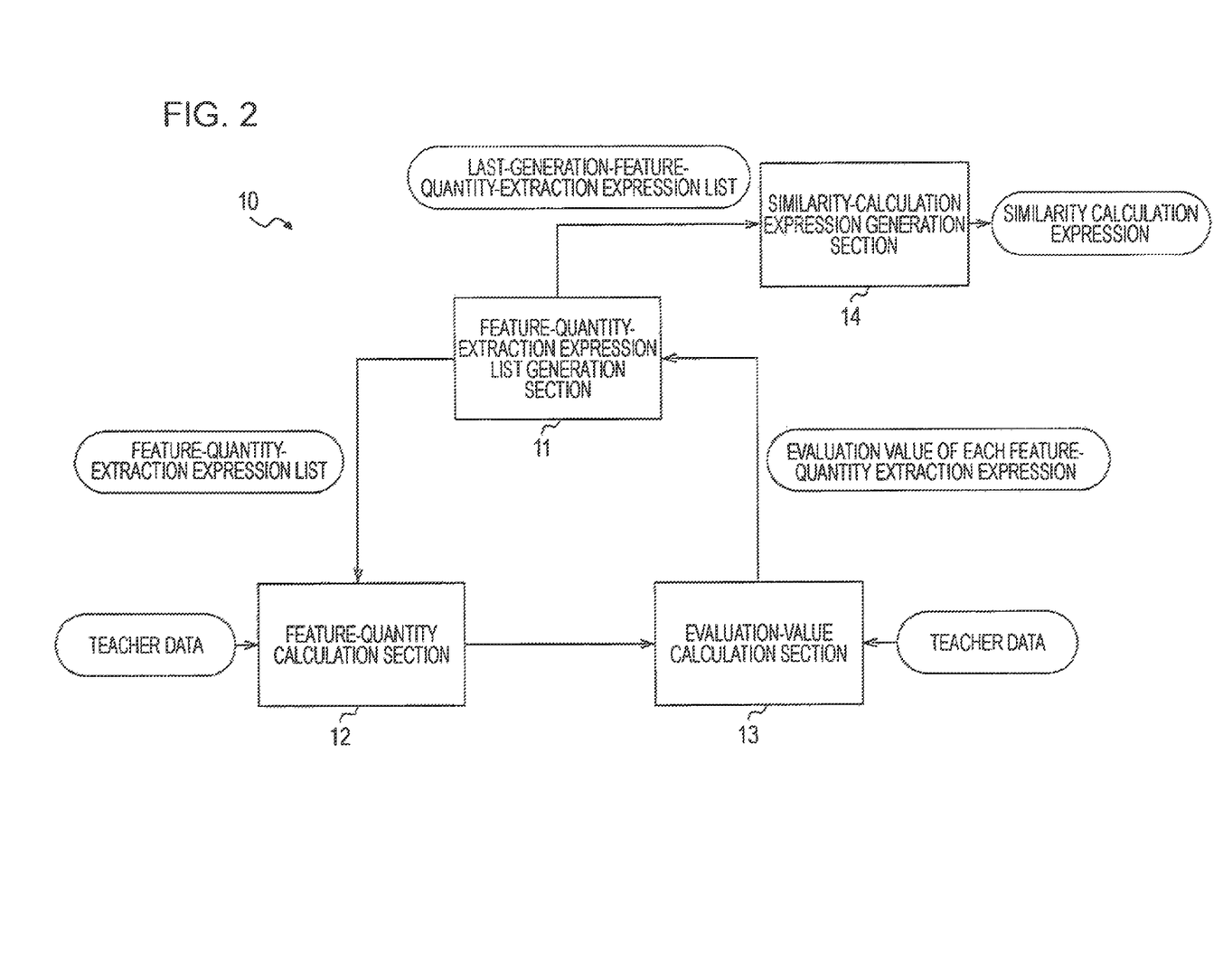
FIG. 2 is a block diagram illustrating an example of a configuration of a similarity-determination-machine development system to which the present invention is applied.

FIG. 2 illustrates an example of a configuration of a similarity-determination-machine development system to which the present invention is applied. The similarity-determination-machine development system 10 includes a feature-quantity-extraction expression list generation section 11 which generates and updates a feature-quantity-extraction expression list including a plurality of feature-quantity extraction expressions, a feature-quantity calculation section 12 which assigns teacher data to the generated feature-quantity extraction expressions to calculate feature quantities, an evaluation-value calculation section 13 which calculates an evaluation value of each feature-quantity extraction expression on the basis of the calculation result by the feature-quantity calculation section 12 and the teacher data, and a similarity-calculation expression generation section 14 which generates a similarity calculation expression on the basis of the last-updated-feature-quantity-extraction expression list.

The feature-quantity-extraction expression list generation section 11 generates feature-quantity extraction expressions which calculate feature quantities of input data, and outputs the feature-quantity-extraction expression list including a plurality of feature-quantity extraction expressions to the feature-quantity calculation section 12.

FIGS. 3A to 3D illustrate examples of feature-quantity extraction expressions generated by the feature-quantity-extraction expression list generation section 11.

In the leftmost input-data field of a feature-quantity-extraction expression, the type of the comparison data C1 and C2 is described. At the right side of the input data, an operator of one kind or more is described in the order of being performed. Each operator includes an axis of processing symmetry and a parameter appropriately.

The kinds of operator include a mean, a fast Fouier transform (FFT), a standard deviation (StDev), an appearance ratio (Ratio), a lowpass filter (LPF), a highpass filter (HPF), an absolute value (ABS), a differential, a maximum value (MaxIndex), an unbiased estimate of variance (UVariance), down sampling (DownSampling), etc. In this regard, for some determined operator, an axis of processing symmetry may be fixed, and in that case, an axis of processing symmetry fixed to a parameter is adopted. Also, if an operator which necessitates a parameter is determined, the parameter is determined to be a random value or a preset value.

Figure 3A:
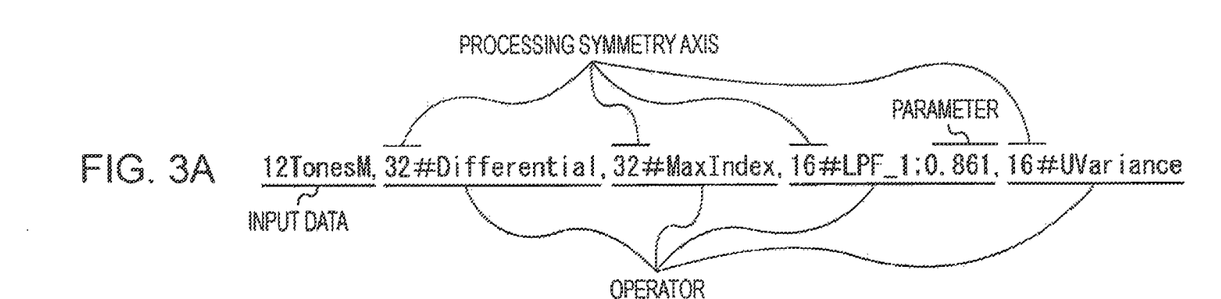
FIGS. 3A to 3D are diagrams illustrating examples of feature-quantity extraction expressions.
Figure 3B:
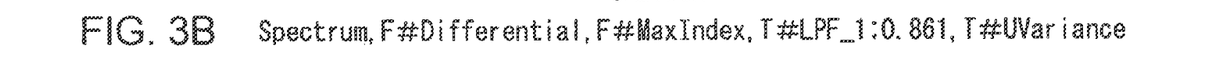
Figure 3C:
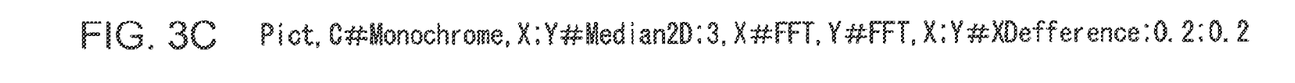
Figure 3D:
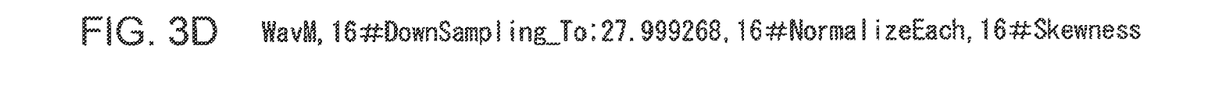

For example, in the case of the feature-quantity-extraction expression shown in FIG. 3A, 12 TonesM is input data, 32# Differential, 32# MaxIndex, 16# LPF_1; 0.861, 16# UVariance are individual operators. Also, 32#, 16#, etc., indicate axes of processing symmetry in individual operators.

Here, 12 TonesM is monophonic PCM (Pulse Coded Modulation sound source) waveform data, 32# indicates an axis of frequency and an axis of tone interval, and 16# indicates an axis of time. The 0.861 in the operator is a parameter in a lowpass filter processing, and for example, shows a threshold value of frequency to be transmitted.

Figure 4:
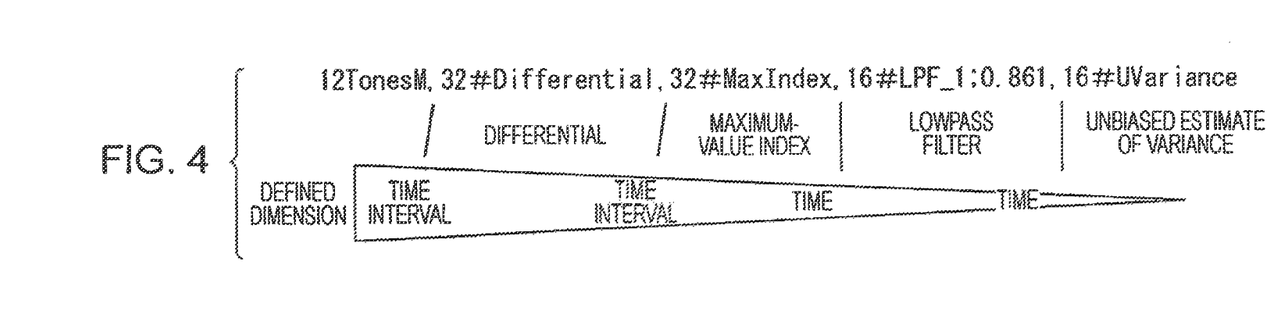
FIG. 4 is a diagram illustrating a structure of the feature-quantity extraction expression.

In this regard, the number and the kind of operators of each feature-quantity-extraction expression constituting a first-generation feature-quantity-extraction expression list are randomly determined. As shown in FIG. 4, there is a restriction on the generation of a feature-quantity-extraction expression such that as operations corresponding to a plurality of operators are performed in sequence, the number of dimensions held by the calculation result decreases in sequence, and thus the final operation result of the feature-quantity-extraction expression becomes a scalar or the number of dimensions thereof becomes smaller than a predetermined small value (for example, 1, 2, or the like). Also, it is necessary that the input data of each feature-quantity-extraction expression constituting the feature-quantity-extraction expression list matches the comparison data C1 and C2.

Figure 5:
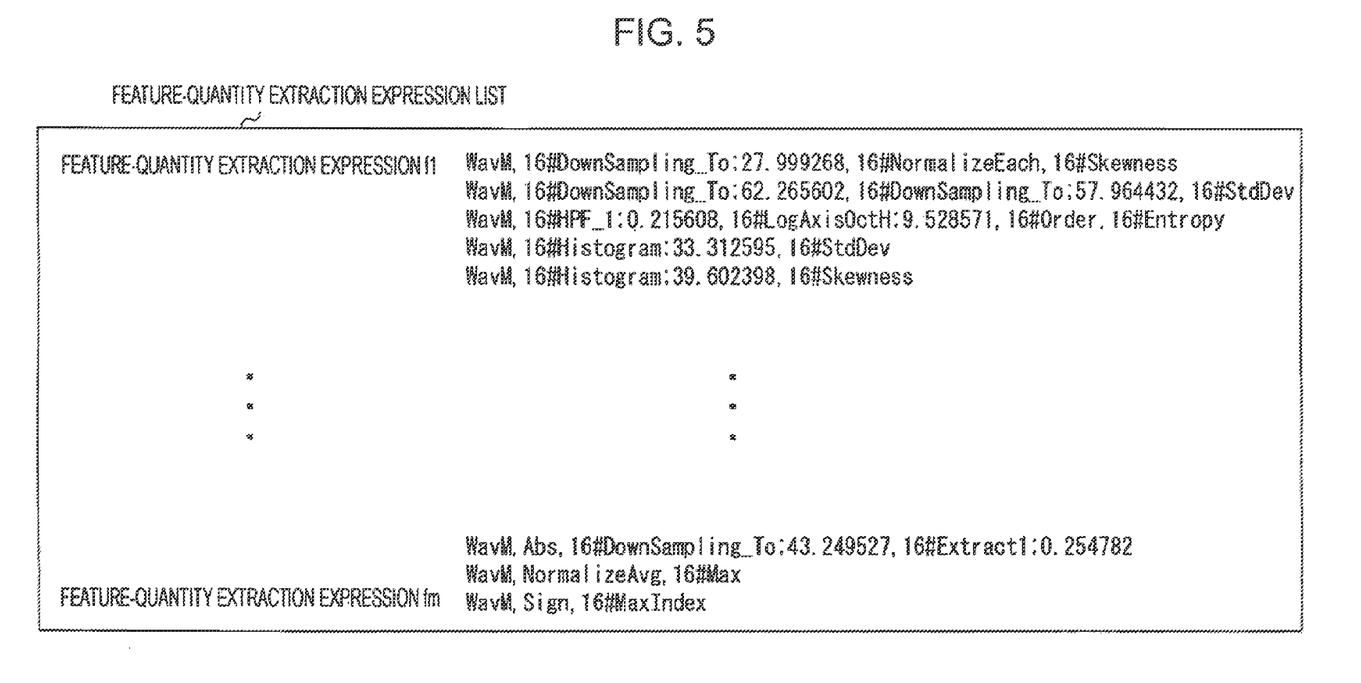
FIG. 5 is a diagram illustrating an example of a list of feature-quantity extraction expressions.

In the following, as shown in FIG. 5, it is assumed that the feature-quantity-extraction expression list generated by the feature-quantity-extraction expression list generation section 11 includes m feature-quantity-extraction expressions f1 to fm. The input data of the feature-quantity-extraction expressions f1 to fm, WavM, is PCM waveform data, and has only a dimension of time axis.

Referring back to FIG. 2, the feature-quantity-extraction expression list generation section 11 generates the next-generation feature-quantity-extraction expression list by updating the created current-generation feature-quantity-extraction expression list in accordance with a genetic algorithm (GA).

Here, the genetic algorithm means an algorithm for generating a next-generation gene from the current-generation gene by selection processing, crossover processing, mutation processing, and random generation processing. Specifically, a plurality of individual feature-quantity-extraction expressions constituting a feature-quantity-extraction expression list are regarded as genes, and selection processing, crossover processing, mutation processing, and random generation processing are performed in accordance with the evaluation values of the plurality of feature-quantity-extraction expressions constituting the current-generation feature-quantity-extraction expression list in order to generate the next-generation feature-quantity-extraction expression list.

Figure 6:
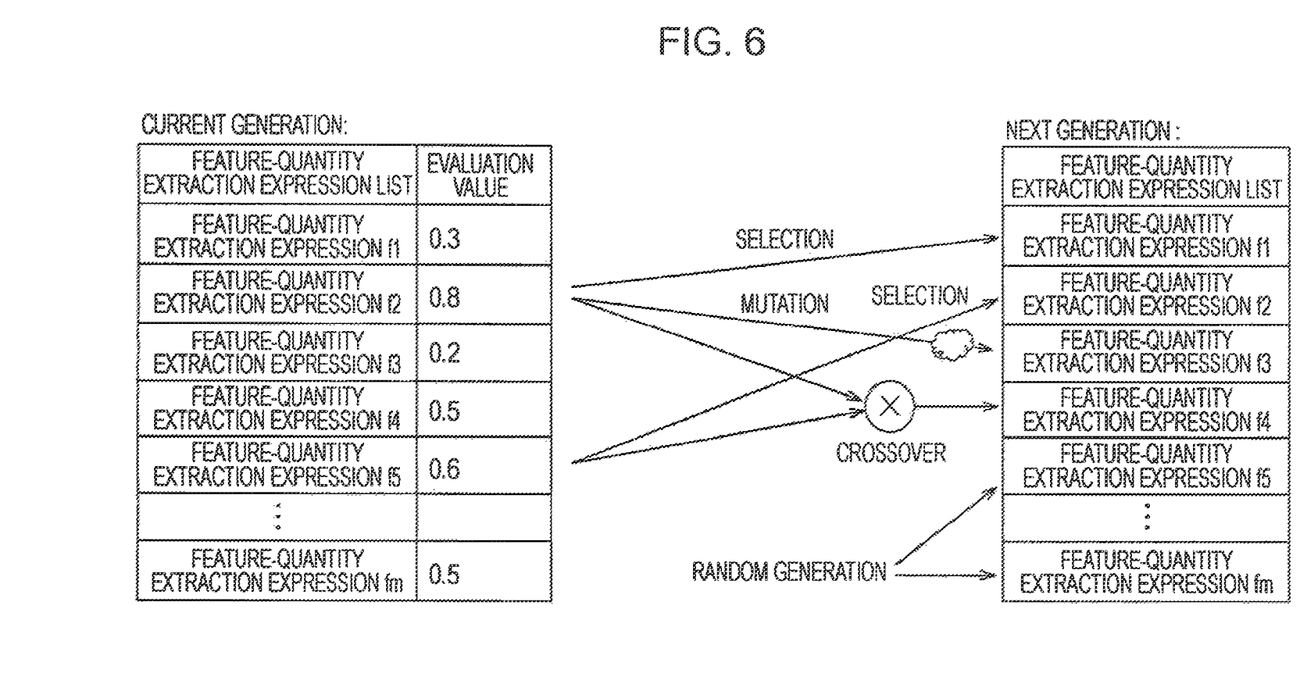
FIG. 6 is a diagram for explaining genetic algorithm.

That is to say, as shown in FIG. 6, in the selection processing, among a plurality of feature-quantity-extraction expressions constituting the current-generation feature-quantity-extraction expression list, a feature-quantity-extraction expression having a high evaluation value is selected to be included in the next-generation feature-quantity-extraction expression list. In the crossover processing, among a plurality of feature-quantity-extraction expressions constituting the current-generation feature-quantity-extraction expression list, feature-quantity-extraction expressions having a high evaluation value are crossed over (combined) to generate a feature-quantity-extraction expression, and the feature-quantity-extraction expression is included in the next-generation feature-quantity-extraction expression list.

In the mutation processing, among a plurality of feature-quantity-extraction expressions constituting the current-generation feature-quantity-extraction expression list, a feature-quantity-extraction expression having a high evaluation value is partly mutated (changed) to generate a feature-quantity-extraction expression to be included in the next-generation feature-quantity-extraction expression list. In the random generation processing, a new feature-quantity-extraction expression is randomly generated to be included in the next-generation feature-quantity-extraction expression list.

Referring back to FIG. 2, the feature-quantity calculation section 12 assigns the teacher data supplied from the outside to the feature-quantity-extraction expression included in the feature-quantity-extraction expression list generated by the feature-quantity-extraction expression list generation section 11 to calculate the feature quantity of the teacher data.

Figure 7:
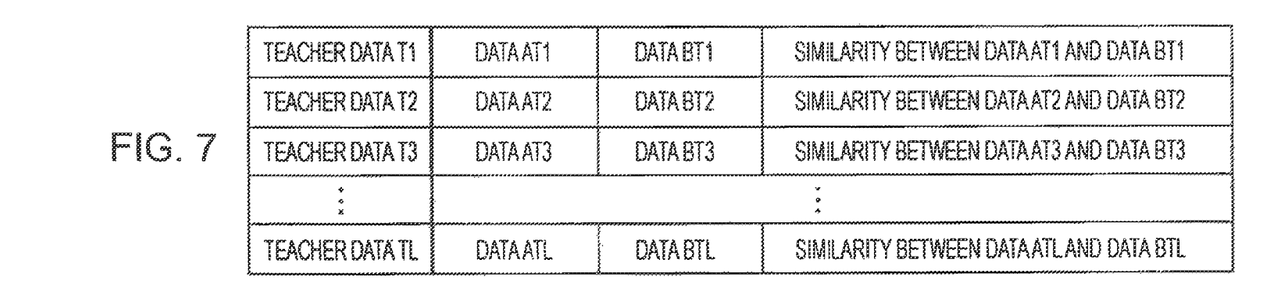
FIG. 7 is a diagram illustrating a data structure of teacher data.

Here, a description will be given of the teacher data supplied to the feature-quantity calculation section 12 with reference to FIG. 7. A plurality of (L pieces in the case of FIG. 7) teacher data T1 to TL are supplied to the feature-quantity calculation section 12. Each teacher data Ti (i=1, 2, . . . , L) includes the same kind of pair of data ATi and BTi as that of the comparison data C1 and C2, and the similarity between the data ATi and the data BTi.

In this regard, the similarity between the data ATi and the data BTi is, for example, the value (for example, an average value of the values obtained by a comparison made by a plurality of persons) obtained by the actual comparison between the pair of data ATi and BTi. The similarity has a value from 0.0 to 1.0 in accordance with a degree of the similarity. If there is no similarity between the two, the value is 0.0, and if the two are completely the same, the value is 1.0.

Accordingly, in the feature-quantity calculation section 12, pairs of data ATi and BTi included in L pieces of the teacher data Ti are assigned to m feature-quantity-extraction expressions fj (j=1, 2, . . . , m) to perform calculation, and thus (L×2×m) feature quantities are calculated. In the following, the calculated (L×2×m) feature quantities are assumed to be as shown in FIG. 8.

That is to say, for example, the pair of data AT1 and BT1 included in the teacher data T1 are individually assigned to the feature-quantity-extraction expression f1 to output the feature quantity f1[AT1]=0.563725 and the feature quantity f1[BT1]=0.42116. Also, for example, the pair of data AT1 and BT1 included in the teacher data T1 are individually assigned to the feature-quantity-extraction expression f2 to output the feature quantity f2[AT1]=0.431047 and the feature quantity f2[BT1]–0.790596.

Further, the feature-quantity calculation section 12 calculates an Euclidean distance (in the following, called a distance of the teacher data Ti in the feature-quantity-extraction expression fj) between the feature quantity fj[ATi] and the feature quantity fj[BTi] obtained by assigning the pair of data ATi and BTi included in the teacher data Ti to the same feature-quantity-extraction expression fj.

Figure 8:
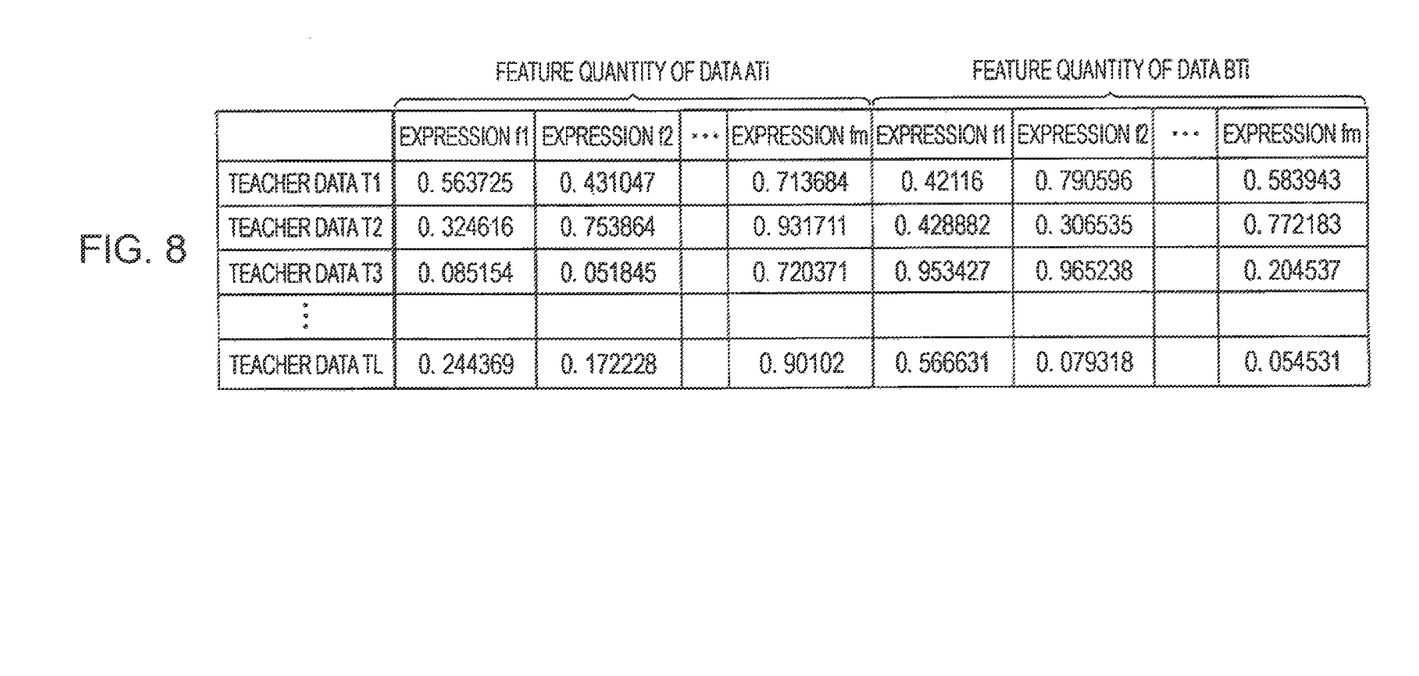
FIG. 8 is a diagram illustrating feature quantities corresponding to the teacher data.
Figure 9:
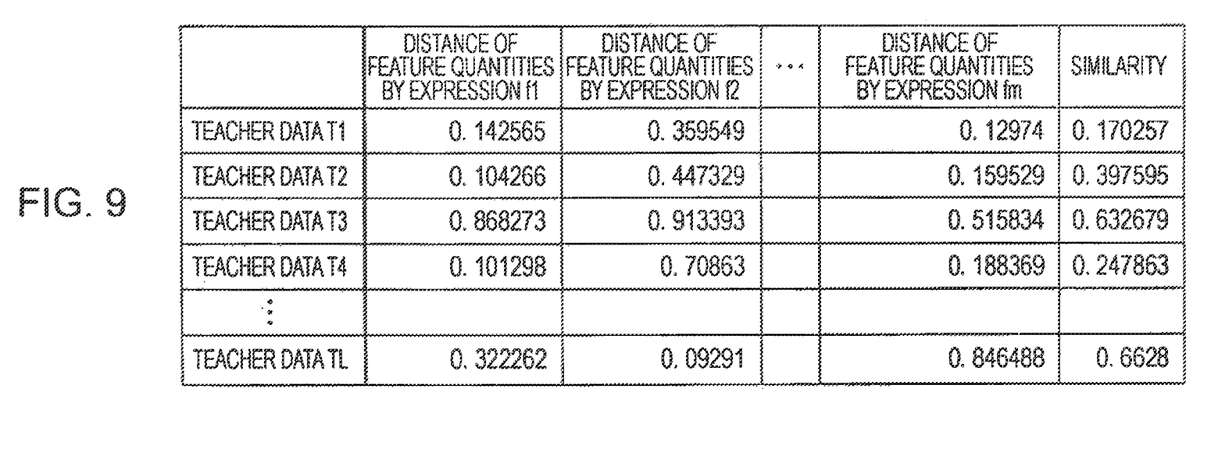
FIG. 9 is a diagram illustrating distances by feature-quantity-extraction expressions of the teacher data.

If the (L×2×m) feature quantities calculated before are as shown in FIG. 8, (L×m) Euclidean distances are calculated as shown in FIG. 9.

That is to say, for example, for a distance of the teacher data T1 in the feature-quantity-extraction expression f1, 0.142565 is output. Also, for example, for a distance of the teacher data T1 in the feature-quantity-extraction expression f2, 0.359549 is output. In this regard, the similarity between the data AT1 and the data BT1 included in the teacher data T1, 0.170257, is a value supplied by being included in the teacher data T1 in advance.

Referring back to FIG. 2, the evaluation-value calculation section 13 calculates a Pearson correlation coefficient as a value showing how much the similarity given as the teacher data Ti can be analogized from the distance of the teacher data Ti in the feature-quantity-extraction expressions f1, and uses this correlation coefficient as the evaluation value of the feature-quantity-extraction expressions f1.

For example, as shown in FIG. 9, if the distances of the teacher data Ti in the feature-quantity-extraction expressions f1 are 0.142565, 0.104266, 0.868273, 0.101298, . . . , 0.322262, and the similarities given as the teacher data Ti are 0.170257, 0.397595, 0.632679, 0.247863, . . . , 0.6628, the Pearson correlation coefficient between the distance of the teacher data Ti in the feature-quantity-extraction expressions f1 and the similarity is calculated to be 0.71, and thus the evaluation value of the feature-quantity-extraction expressions f1 is determined to be 0.71.

In the same manner, the evaluation values of the feature-quantity-extraction expressions f2 to fm are calculated.

Referring back to FIG. 2, the similarity-calculation expression generation section 14 estimates a similarity calculation expression on the basis of feature-quantity-extraction expression list, which has been updated by the feature-quantity-extraction expression list generation section 11 for the last time, namely, which is of last generation.

Specifically, linear combination coefficients b1 to bm of the similarity calculation expression shown by the following expression are estimated by linear regression using the distance between the feature quantity fj[ATi] and the feature quantity fj[BTi] obtained by assigning the pair of data ATi and BTi of the teacher data Ti to the feature-quantity-extraction expression fj, and the similarity Si between the data ATi and the data BTi included in the teacher data.

$$Si = b1(f1[ATi]-f1[Bi])^2 + b2(f2[ATi]-f2[BTi])^2 + \ldots + bm(fm[ATi]-fm[BTi])^2$$

In this regard, for the estimation of the similarity calculation expression, all the feature-quantity-extraction expressions f1 to fm included in the last-generation feature-quantity-extraction expression list may be used, or a part of the feature-quantity-extraction expressions f1 to fm may be used.

Figure 10:
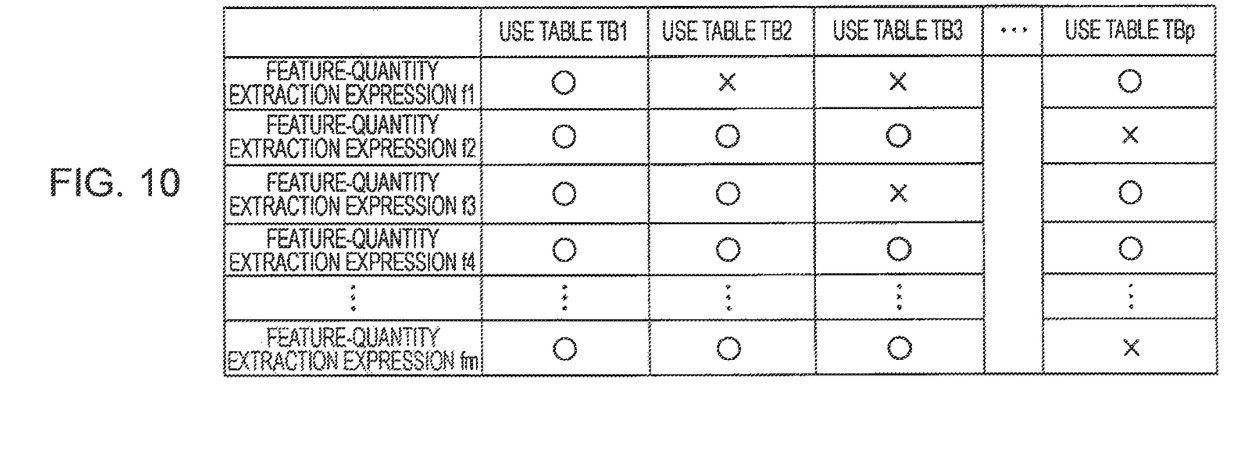
FIG. 10 is a diagram illustrating an example of a group of use tables.

If a part of the feature-quantity-extraction expressions f1 to fm are used, as shown in FIG. 10, a use table TBk (k=1, 2, . . . , p) (a circular mark indicates being used, and an X mark indicates not being used) indicating which feature-quantity-extraction expression is used among the feature-quantity-extraction expressions f1 to fm is randomly generated. In the following, a plurality of the generated use table TBk is called a group of use tables.

Next, the above-described similarity calculation expression is estimated using a part of the feature-quantity-extraction expressions f1 to fm corresponding to each table TBk, and each use table TBk is evaluated on the basis of the evaluation value using the estimation result as reference amount of information, such as AIC, etc.

Furthermore, each use table TBk is regarded as a gene, and the group of individual use tables TBk is updated by a genetic algorithm until the evaluation of the table having the best evaluation (having a minimum AIC value) among the last use table TBk stops increasing. Next, the similarity calculation expression that has been estimated on the basis of the use table TBk having the best evaluation (having a minimum AIC value) among the last use table TBk is output as a last similarity calculation expression.

A description will be given of the operation of the similarity-determination-machine development system 10 constituted as described above with reference to a flowchart in FIG. 11.

Figure 11:
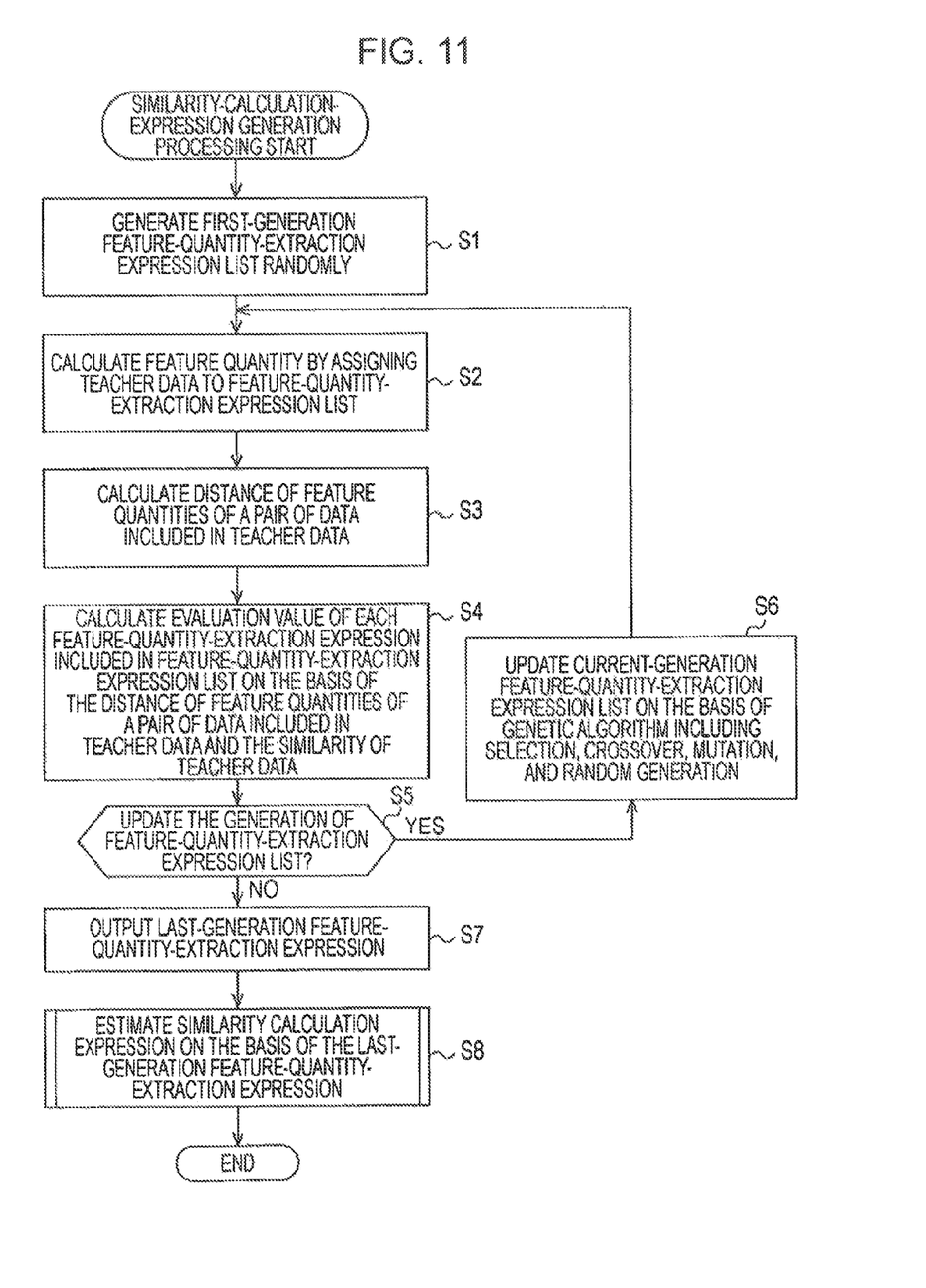
FIG. 11 is a flowchart illustrating an operation of the similarity-determination-machine development system to which the present invention is applied.

In step S1, the feature-quantity-extraction expression list generation section 11 randomly generates the m feature-quantity-extraction expressions constituting the first-generation feature-quantity-extraction expression list, and supplies the feature-quantity-extraction expression list including m feature-quantity-extraction expressions to the feature-quantity calculation section 12.

In step S2, the feature-quantity calculation section 12 individually assigns the data ATi and the data BTi of the teacher data Ti supplied from the outside to the feature-quantity-extraction expression fj included in the feature-quantity-extraction expression list supplied from the feature-quantity-extraction expression list generation section 11 to calculate the (L×2×m) feature quantities of the teacher data as shown in FIG. 8.

In step S3, the feature-quantity calculation section 12 calculates a distance of the teacher data Ti in the feature-quantity-extraction expressions fj, and supplies the (L×m) Euclidean distances shown in FIG. 9 to the evaluation-value calculation section 13.

In step S4, the evaluation-value calculation section 13 calculates a Pearson correlation coefficient as a value showing how much the similarity given as the teacher data Ti can be analogized from the distance of the teacher data Ti in the feature-quantity-extraction expressions f1, and uses this correlation coefficient as the evaluation value of the feature-quantity-extraction expressions f1. In the same manner, the evaluation-value calculation section 13 calculates the evaluation value of the feature-quantity-extraction expressions f2 to fm, and outputs the calculated feature-quantity-extraction expressions f2 to fm to the feature-quantity-extraction expression list generation section 11.

In step S5, the feature-quantity-extraction expression list generation section 11 determines whether to update the feature-quantity-extraction expression list. Here, if the evaluation values of the feature-quantity-extraction expressions f1 to fm included in the current-generation feature-quantity-extraction expression list calculated by the evaluation-value calculation section 13 meet a predetermined condition, the feature-quantity-extraction expression list is determined to be updated. If the evaluation values do not meet the predetermined condition, the feature-quantity-extraction expression list is determined not to be updated.

Here, a predetermined condition is, for example, that there is a feature-quantity-extraction expression having an evaluation value exceeding a predetermined threshold value among the feature-quantity-extraction expressions f1 to fm included in the current-generation feature-quantity-extraction expression list.

In step S5, if determined to update the current-generation feature-quantity-extraction expression list, the processing proceeds to step S6. In step S6, the feature-quantity-extraction expression list generation section 11 updates the current-generation feature-quantity-extraction expression list in accordance with the genetic algorithm, and thereby generates the next-generation feature-quantity-extraction expression list to supply the generated list to the feature-quantity calculation section 12.

Specifically, as the selection processing of the genetic algorithm, among a plurality of feature-quantity-extraction expressions constituting the current-generation feature-quantity-extraction expression list, a feature-quantity-extraction expression having a high evaluation value is selected to be included in the next-generation feature-quantity-extraction expression list. Also, as the crossover processing of the genetic algorithm, among a plurality of feature-quantity-extraction expressions constituting the current-generation feature-quantity-extraction expression list, two feature-quantity-extraction expressions are selected by giving higher weights to the feature-quantity-extraction expressions having higher evaluation values so as to be easily selected. Then, the two selected feature-quantity-extraction expressions are crossed over (combined) to generate mx feature-quantity-extraction expressions, and the feature-quantity-extraction expressions are included in the next-generation feature-quantity-extraction expression list.

Further, as the mutation processing of the genetic algorithm, among a plurality of feature-quantity-extraction expressions constituting the current-generation feature-quantity-extraction expression list, one feature-quantity-extraction expression is selected by giving higher weights to the feature-quantity-extraction expressions having higher evaluation values so as to be easily selected. Then, the one selected feature-quantity-extraction expression is partly mutated (changed) to generate mm feature-quantity-extraction expressions to be included in the next-generation feature-quantity-extraction expression list. Furthermore, as the random generation processing of the genetic algorithm, mr (=m−ms−mx−mm) new feature-quantity-extraction expressions are randomly generated to be included in the next-generation feature-quantity-extraction expression list.

The next-generation feature-quantity-extraction expression list is generated as described above, and is supplied to the feature-quantity calculation section 12. Next, the processing returns to step S2, and the processing of steps S2 to S6 is repeated. In step S5, if it is determined that the current-generation feature-quantity-extraction expression list is not updated, the processing proceeds to step S7.

In step S7, the feature-quantity-extraction expression list generation section 11 supplies the current-generation feature-quantity-extraction expression list, namely, the last-generation feature-quantity-extraction expression list to the similarity-calculation expression generation section 14.

In step S8, the similarity-calculation expression generation section 14 estimates the similarity calculation expression on the basis of the last-generation feature-quantity-extraction expression list supplied from the feature-quantity-extraction expression list generation section 11.

Figure 12:
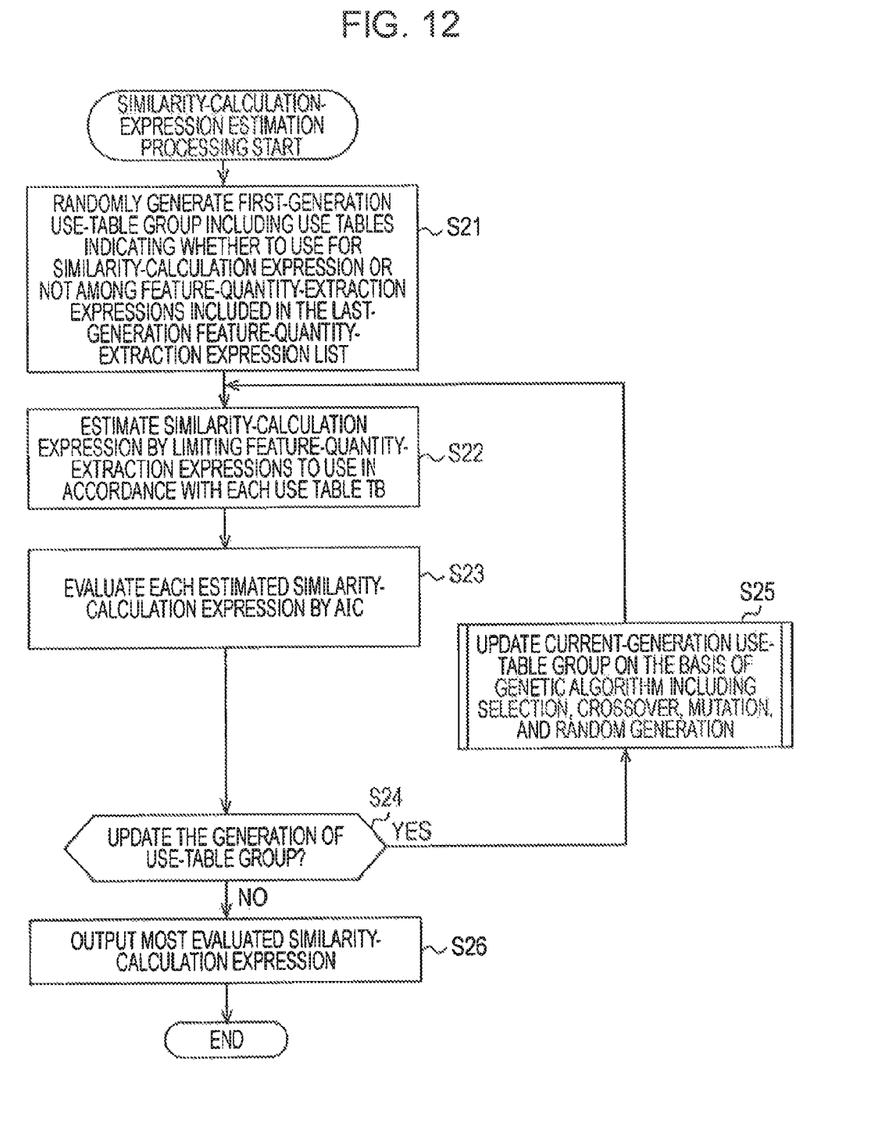
FIG. 12 is a flowchart illustrating processing of step S8 in FIG. 11.

A detailed description will be given of the processing of step S8 with reference to a flowchart in FIG. 12.

In step S21, as shown in FIG. 10, the similarity-calculation expression generation section 14 randomly generates a group of use tables including a use table TBk (k=1, 2, . . . , p) indicating which feature-quantity-extraction expression is to be used among the feature-quantity-extraction expressions f1 to fm included in the last-generation feature-quantity-extraction expression list.

In step S22, the similarity-calculation expression generation section 14 estimates the above-described similarity calculation expression using a part of the feature-quantity-extraction expressions f1 to fm corresponding to each table TBk. In step S23, the similarity-calculation expression generation section 14 evaluates each use table TBk on the basis of the evaluation value using the estimation result as reference amount of information, such as AIC, etc.

In step S24, the similarity-calculation expression generation section 14 determines whether to update the group of use tables. Here, it is determined not to update if the evaluation of an expression having the best evaluation among the use table TBk included in the current-generation group of use tables has not been increased from the past few generations. Alternatively, it is determined to update if the evaluation of an expression having the best evaluation among the use table TBk included in the current-generation group of use tables has been increased with going through the generations.

In step S24, if determined that the current-generation group of use tables is updated, the processing proceeds to step S25. In step S25, the similarity-calculation expression generation section 14 updates the current-generation group of use tables in accordance with the genetic algorithm, thereby generating the next-generation group of use tables.

After that, the processing returns to step S22, and the processing of the steps S22 to 25 is repeated. In step S24, if it is determined that the current-generation group of use tables is not updated, the processing proceeds to step S26.

In step S26, the similarity-calculation expression generation section 14 determines the similarity calculation expression that has been estimated on the basis of the use table TBk having the best evaluation (having a minimum AIC value) among the last-generation group of use tables as a final similarity calculation expression, and outputs the expression to the subsequent stage.

In the above, the description of the operation of the similarity-determination-machine development system 10 has been completed.

As described above, by the similarity-determination-machine development system 10 to which the present invention is applied, it is possible to generate a similarity determination expression capable of determining the similarity between two pieces of comparison data C1 and C2 of any kinds.

The similarity calculation expression generated in this manner is applied to the similarity determination apparatus 1 shown in FIG. 1. The similarity determination apparatus 1 can be used for developing a system searching the other music data similar to input music data (may be a segment of music) from a database storing a large number of pieces of music data, for example. Also, for example, in an application program achieving a so-called a slide show, which displays a plurality of images by changing the images in sequence, a use is considered for detecting a pair of similar images from a plurality of images, and only one of the images is included from the pair to be included in the slide show.

In this regard, a description has been given of the case of determining the similarity between two input data. However, by performing the similarity determination on all the combinations of a plurality of data, for example, the present invention can be applied to the case of determining the similarity among larger number of pieces of data.

The above-described series of processing can be executed by hardware or can be executed by software. When the series of processing is executed by software, the programs constituting the software are built in a dedicated hardware of a computer. Alternatively, the various programs are installed, for example in a general-purpose personal computer capable of executing various functions from a program recording medium.

Figure 13:
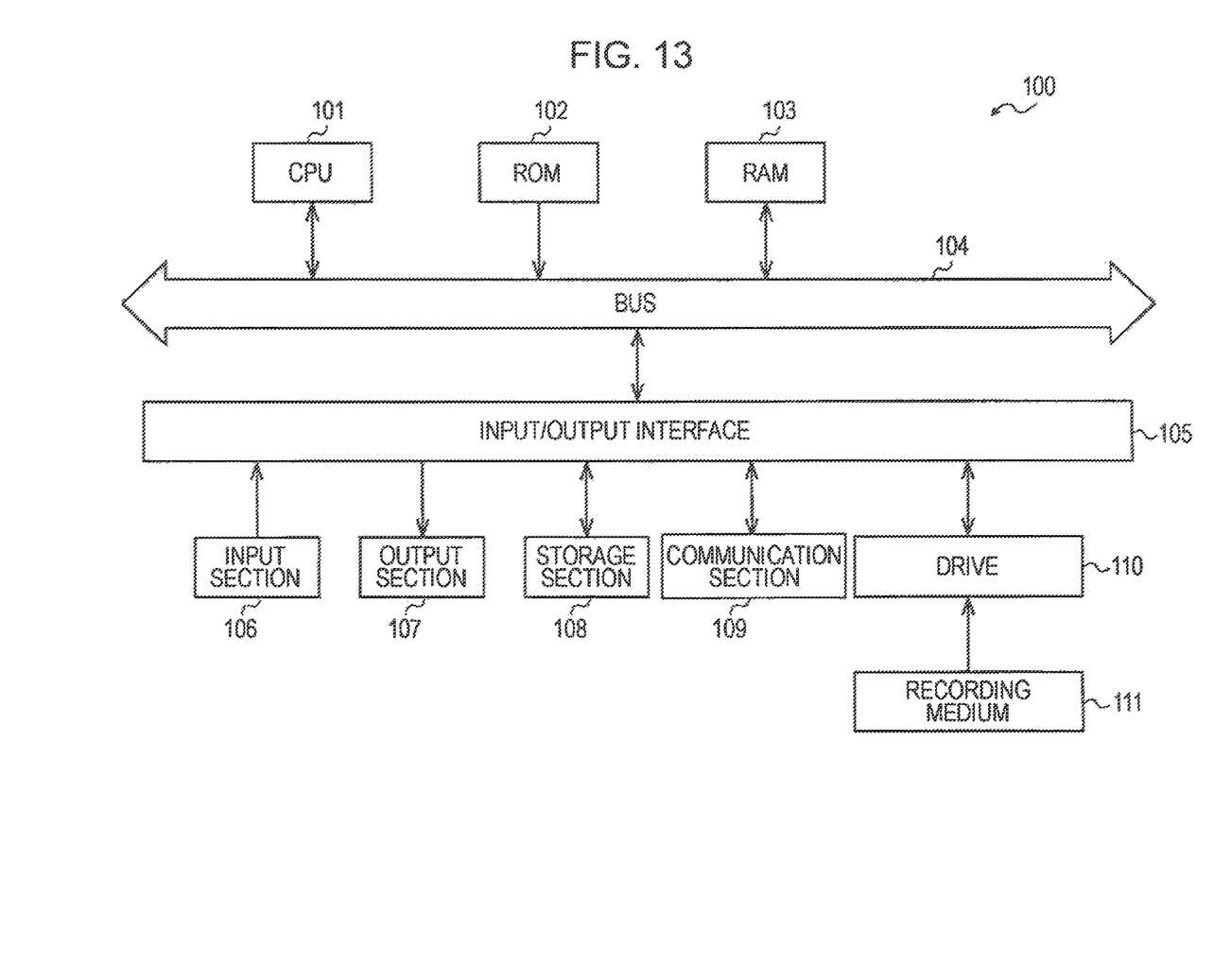
FIG. 13 is a block diagram illustrating an example of a configuration of a computer.

FIG. 13 is a block diagram illustrating an example of a configuration of computer hardware performing the above-described series of processing.

In the computer 100, a CPU (Central Processing Unit) 101, a ROM (Read Only Memory) 102, a RAM (Random Access Memory) 103 are mutually connected by a bus 104.

An input/output interface 105 is also connected to the bus 104. An input section 106 including a keyboard, a mouse, a microphone, etc., an output section 107 including a display, a speaker, etc., a storage section 108 including a hard disk, a nonvolatile memory, etc., a communication section 109 including a network interface, etc., and a drive 110 for driving a removable medium 111, such as a magnetic disk, an optical disc, a magneto-optical disc, or a semiconductor memory, etc., are connected to the input/output interface 105.

In the computer having the configuration as described above, the CPU 101 loads the program stored, for example in storage section 108 to the RAM 103 through the input/output interface 105 and the bus 104 to execute the program, thereby the above-described series of processing is performed.

In this regard, the programs executed by the computer may be programs that are processed in time series in accordance with the described sequence in this specification. Also, the programs may be the programs to be executed in parallel or at necessary timing, such as at the time of being called, or the like.

Also, the program may be performed on one computer, or may be distributedly performed on a plurality of computers. Moreover, the program may be transferred to a remote computer to be performed.

Also, in this specification, a system represents the overall apparatus including a plurality of apparatuses.

In this regard, an embodiment of the present invention is not limited to the above-described embodiments, and various modifications are possible without departing from the spirit of the present invention.

What is claimed is:

1. An information processing system for generating a similarity determination algorithm determining a similarity between a pair of data, the information processing system comprising:
a circuitry configured to:
generate a feature-quantity-extraction expression list including a plurality of feature-quantity-extraction expressions, by modifying the feature-quantity-extraction expression list of a preceding generation on the basis of an evaluation value of each of the feature-quantity-extraction expressions of a preceding generation, each of the feature-quantity-extraction expressions including an operator;
input first teacher data and second teacher data into the feature-quantity-extraction expressions included in the feature-quantity-extraction expression list to calculate, for each of the feature-quantity-extraction expressions, a feature quantity corresponding to the first teacher data and a feature quantity corresponding to the second teacher data;
calculate the evaluation value of each of the feature-quantity-extraction expressions included in the feature-quantity-extraction expression list using the calculated feature quantities and a known similarity between the first teacher data and the second teacher data; and
estimate a similarity calculation expression using:
a distance between feature quantities calculated by inputting the first teacher data and the second teacher data into one of the feature-quantity-extraction expressions, and
the known similarity between the first teacher data and the second teacher data.

2. The information processing system according to claim 1, wherein the circuitry is configured to generate the feature-quantity-extraction expression list by updating the feature-quantity-extraction expression list of a preceding generation.

3. The information processing system according to claim 2, wherein the circuitry is further configured to:
randomly generate a plurality of the feature-quantity-extraction expressions included in the feature-quantity-extraction expression list of a first generation,
identify the feature-quantity-extraction expression list of a second generation and after as a gene of the plurality of feature-quantity-extraction expressions included in the feature-quantity-extraction expression list of a preceding generation, and generate the feature-quantity-extraction expression list by updating the feature-quantity-extraction expression list of the preceding generation.

4. The information processing system according claim 3, wherein the circuitry is configured to generate the feature-quantity-extraction expression list using a genetic algorithm including at least one of selection processing, crossover processing, or mutation processing on the basis of the evaluation value of each of the feature-quantity-extraction expressions.

5. The information processing system according to claim 2, wherein the circuitry is further configured to:

generate a use-table group including a plurality of use tables classifying the feature-quantity-extraction expressions included in the feature-quantity-extraction expression list of the last generation into use or non-use, calculate a reference amount of information of an estimation result as an evaluation value of the use table, and update the use-table group using a genetic algorithm regarding the use table as a gene.

6. The information processing system according to claim 2, wherein the circuitry is further configured to calculate a correlation coefficient between the known similarity between the first teacher data and the second teacher data and the distance between the first teacher data and the second teacher data calculated using a feature-quantity-extraction expression, and use the correlation coefficient as the evaluation value of the corresponding feature-quantity-extraction expression.

7. The information processing system according to claim 1, wherein the circuitry is configured to estimate the similarity calculation expression by regression or by determination.

8. The information processing system according to claim 1, wherein the data is image data.

9. The information processing system according to claim 8, wherein the circuitry is further configured to detect a pair of similar images from a plurality of images.

10. The information processing system according to claim 9, wherein the circuitry is further configured to control a display to display an image of the pair of the images.

11. The information processing system according to claim 10, wherein the circuitry is further configured to control the display to display a plurality of images by changing the images in sequence.

12. The information processing system according to claim 1, wherein the data is music data.

13. The information processing system according to claim 12, wherein the circuitry is further configured to extract music data similar to input music data from a database.

14. A method for generating a similarity determination algorithm determining a similarity between a pair of data, the method comprising:

generating a feature-quantity-extraction expression list including a plurality of feature-quantity-extraction expressions, by modifying the feature-quantity-extraction expression list of a preceding generation on the basis of an evaluation value of each of the feature-quantity-extraction expressions of a preceding generation, each of the feature-quantity-extraction expressions including an operator;

inputting first teacher data and second teacher data into the feature-quantity-extraction expressions included in the feature-quantity-extraction expression list to calculate, for each of the feature-quantity-extraction expressions, a feature quantity corresponding to the first teacher data and a feature quantity corresponding to the second teacher data;

calculating the evaluation value of each of the feature-quantity-extraction expressions included in the feature-quantity-extraction expression list using the calculated feature quantities and a known similarity between the first teacher data and the second teacher data; and estimating a similarity calculation expression using:

a distance between feature quantities calculated by inputting the first teacher data and the second teacher data into one of the feature-quantity-extraction expressions, and the known similarity between the first teacher data and the second teacher data.

15. A non-transitory computer-readable medium storing instructions for generating a similarity determination algorithm determining a similarity between a pair of data, the instructions, when executed, causing a computer to:

generate a feature-quantity-extraction expression list including a plurality of feature-quantity-extraction expressions, by modifying the feature-quantity-extraction expression list of a preceding generation on the basis of an evaluation value of each of the feature-quantity-extraction expressions of a preceding generation, each of the feature-quantity-extraction expressions including an operator;

input first teacher data and second teacher data into the feature-quantity-extraction expressions included in the feature-quantity-extraction expression list to calculate, for each of the feature-quantity-extraction expressions, a feature quantity corresponding to the first teacher data and a feature quantity corresponding to the second teacher data;

calculate the evaluation value of each of the feature-quantity-extraction expressions included in the feature-quantity-extraction expression list using the calculated feature quantities and a known similarity between the first teacher data and the second teacher data; and estimate a similarity calculation expression using:

a distance between feature quantities calculated by inputting the first teacher data and the second teacher data into one of the feature-quantity-extraction expressions, and the known similarity between the first teacher data and the second teacher data.

* * * * *